(No Model.)
J. J. KULAGE.
BLANK FOR NEGOTIABLE INSTRUMENTS.
No. 600,917.  Patented Mar. 22, 1898.
Fig. I.
Fig. II. 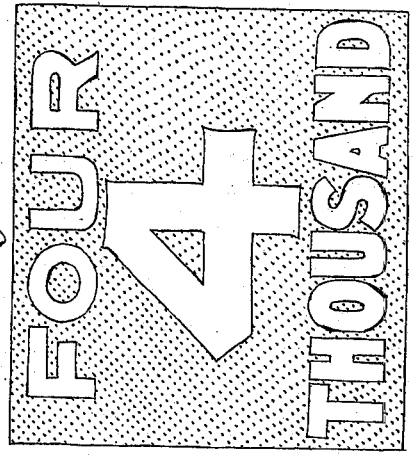
Fig. III. 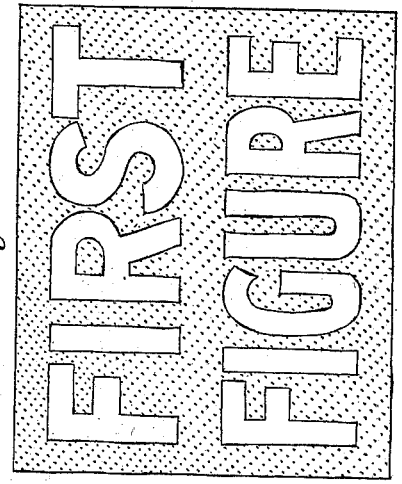
Witnesses,
Stephen Wm Hirschberg.
Guido P. Gottermann.
Inventor,
Joseph J. Kulage
by Benj. F. Rex
Atty.
THE NORRIS PETERS CO., PHOTO-LITHO., WASHINGTON, D. C.

UNITED STATES PATENT OFFICE.

JOSEPH J. KULAGE, OF ST. LOUIS, MISSOURI.

BLANK FOR NEGOTIABLE INSTRUMENTS.

SPECIFICATION forming part of Letters Patent No. 600,917, dated March 22, 1898.

Application filed January 7, 1897. Serial No. 618,266. (No model.)

*To all whom it may concern:*

Be it known that I, JOSEPH J. KULAGE, a citizen of the United States, residing at St. Louis, in the State of Missouri, have invented a new and useful Improvement in Blanks for Negotiable Instruments, of which the following is a specification.

My invention relates to improvements in blanks for checks and other negotiable instruments which are liable to be fraudulently altered by holders; and the objects of my improvements are, first, to provide in the body of the instrument spaces for figures indicating the number of dollars, if any, payable and other adjacent spaces for figures representing the number of cents, if any, payable, each space adapted to contain one figure and so arranged that when unused spaces to the right are punched or marked the number of figures inserted in the spaces cannot be changed without detection; second, to provide means for indicating the proper spaces for the different figures; third, to provide improved means for preventing the alteration of figures inserted in said spaces; fourth, to provide a series of spaces arranged in order with words or figures therein indicating different amounts which can when punched or marked be made to indicate the amount payable; fifth, to provide means in the body of the instrument indicating to the reader that the instrument is void unless the amount made payable by the body thereof corresponds with the punched or marked spaces containing words or figures, or both, indicating amounts as aforesaid; sixth, to combine spaces for figures in the body of the instrument—spaces indicating amounts as aforesaid—and means indicating that the amounts punched or marked out must correspond with the amount called for in the body of the instrument; seventh, to provide means for preventing any space indicating an amount from being punched or marked after the instrument leaves the hands of the maker or drawer, and, eighth, to provide means for facilitating the detection of the filling of punched holes or the erasure of marks in spaces containing words or figures, or both, indicating amounts. I attain these objects by the means illustrated in the accompanying drawings, in which—

Figure 1 is a check embodying my improvement, except the preferred form of letters, figures, and background hereinafter mentioned. Fig. 2 is an enlarged detailed view of a space to be punched or marked, illustrating the preferred form of printing and background used in such spaces; and Fig. 3 is an enlarged detailed view of a space for the reception of one of the figures indicating the number of dollars payable and illustrating the preferred form of background used in the dollar and cent spaces and the preferred form of printing used in said dollar-spaces.

Similar letters refer to similar parts throughout the several views.

A is the usual space for the name of the person to whom the instrument is made payable. It is shown filled out with the name of a drawee—John Doe.

B is a space in which the amount payable is designed to be written, the amount in dollars in words and the fraction of a dollar, if any, in figures, and it is shown filled out in the usual way with the amount payable, which in this case is made seven hundred and twenty-four dollars and fifty-four cents.

C is a portion of the instrument shown inclosed in boundary-lines and divided up by suitable division-lines into dollar-spaces $c$, arranged in a horizontal row, and a row of cent-spaces $c'$, one cent-space being arranged above each dollar-space. This portion of the instrument is preferably but not necessarily located to the right of the blank A, designed for the name of the drawee or payee. It may be located at any convenient point in the body of the instrument, by which I mean all that portion included within the usual boundaries of such an instrument, and which in the instrument illustrated would be all that part above the spaces designed to be punched or marked and above the printing appearing below the signature.

To the left of the row of dollar-spaces $c$ I preferably place the usual dollar-mark to indicate that said row is intended for figures indicating the number of dollars, if any, payable, and to the left of the cent-spaces $c'$ I preferably place the abbreviation "Cts.," or use some other equivalent means to indicate that said spaces are for figures indicating the number of cents, if any, payable. All that portion of said dollar and cent spaces not occupied by letters or figures formed therein by printing when the blank is prepared is preferably occupied by a background. (Omitted from Fig. 1 for purposes of clearness, but shown clearly in Fig. 3.) This background consists of lines, and preferably of lines formed of fine dots, such as are produced by the half-tone process of photo-engraving when a screen-plate is used.

Within each dollar-space c I preferably print words or figures, but preferably words, indicating the number of the figure, counting from the left, to be inserted in such space. Thus in the first space I preferably insert the words "First figure," in the second space "Second figure," &c., each space being intended for a single figure only.

In Fig. 1 the words appear in black on a white background, being thus arranged for purposes of clearness in illustrating, and they may be so printed in practice; but I prefer to have the words appear on a darker background, as they do in Fig. 3, so as to allow the figure inserted in the space in writing to stand out clearly. As will be obvious, it is not essential to this feature of the improvement that the letters should appear white, as shown; but they should preferably be lighter than the background or of a different shade or color from ordinary black ink. Preferably the words used are in each case entirely inclosed within the dollar-space to which they appertain, but this is not essential.

The portion C is shown in Fig. 1 filled out with the amount payable, "7" being placed in the space in which the words "First figure" appear; "2" in the second dollar-space, and "4" in the third dollar-space. The figure "5" is written in the cent-space above the fourth dollar-space and the figure "4" in the cent-space above the fifth dollar-space and the cent-space to the right of those filled out, and the unused dollar-spaces are marked or punched so as to prevent the insertion of another figure in the dollar-spaces. When the spaces in the portion C of the instrument are thus filled out, the figures appear as they usually do in a check; but the number thereof cannot be increased, and the form of background preferably used enables alterations to be readily detected.

In connection with the instrument, and preferably beneath the body thereof, I preferably arrange a series of rows of spaces designed to contain words or figures, or both, indicating different amounts in dollars or cents. I prefer to use four rows of dollar-spaces—viz., one for units, one for tens, one for hundreds, and one for thousands—and two rows of spaces for cents—viz., one for units and one for tens. In the first space to the left in each row I preferably insert a word or words meaning "none," thus, "No thousands," "No hundreds," &c., as shown in Fig. 1. In the next space I preferably insert words and figures indicating one thousand, one hundred, one ten, or the other lowest amount to appear in the row, and in each row I increase the amounts in the spaces from left to right arithmetically, substantially as shown. I prefer to use words in each space, because they are more readily understood than figures, and I consider the combination of words and figures shown better than either words or figures standing alone. I prefer to have the words and figures used appear on a background of dotted lines and to be lighter than the background, substantially as shown in Fig. 2, which is an enlarged detailed view of space d, Fig. 1, showing the preferred background and method of indicating the amount, which could not be shown in Fig. 1 by reason of lack of space. In connection with these spaces I prefer to use directions indicating that one space in each row of spaces D must be punched or marked, and that the amount appearing in the body of the check and the amount indicated by the spaces punched or marked must correspond. I also preferably insert in the body of the instrument a statement to the effect that the instrument is void unless the punched or marked spaces correspond with the amount called for by the body of the instrument.

The check illustrated being one given for $724.54, and there being no thousands in the amount, the first space in the thousands row is punched or marked. There being seven hundreds in the amount, the space in the hundreds row containing the words "Seven hundreds" is punched. There being two tens, the space in the tens row containing the word "Twenty" is punched. So, also, the space in the units row containing the word "Four" is punched to indicate four units. The space containing the word "Fifty" in the upper cents row is punched to indicate fifty cents, and the space in the lower cents row containing the word "Four" is punched to indicate four cents. The amount payable is thus made to clearly appear by the punch-marks, as well as by the words and figures appearing in the body of the instrument.

As will be obvious, a space in which an amount is printed may be canceled by means of a cross or other mark in place of being punched. By thus punching or crossing out one space in each row alteration becomes substantially impossible, especially as the printing in the different spaces and the peculiar background used tend to prevent the refilling of holes formed by punching or the erasure of marks made with pen and ink.

I claim—

1. As a new article of manufacture, a blank negotiable instrument having a space in the body thereof for the insertion in written words of the number of dollars payable; a series of dollar-spaces arranged in a row and each of a size to receive a single written figure and each having therein means indicating the number, counting from the left, of the figure to be placed therein; above said row of dollar-spaces a substantially parallel row of cent-spaces of the same number, width, and alinement; means indicating that the dollar-spaces are for figures indicating the number of dollars payable, and means indicating that the cent-spaces are for figures to indicate the number of cents payable.

2. As a new article of manufacture, a blank negotiable instrument having in the body thereof a space for the insertion in written words of the number of dollars payable; a series of dollar-spaces arranged in a row, and each of a size adapted to receive a single written figure, and each having therein means indicating the number, counting from the left, of the figure to be placed therein, and having the space therein unoccupied by such means lined to enable erasures to be detected; a substantially parallel row of cent-spaces of the same number, width and alinement, above the row of dollar-spaces and means indicating that the lower row of spaces are for the insertion of figures indicating dollars: and means indicating that the upper row of spaces are for figures indicating cents, substantially as described.

3. As a new article of manufacture, a blank negotiable instrument having a space in the body thereof, for the insertion in written words, of the number of dollars payable; a series of dollar-spaces, arranged in a row, and each of a size to receive a single written figure, and each having therein, means indicating the number, counting from the left, of the figure to be placed therein; above said row of dollar-spaces a substantially parallel row of cent-spaces of the same number, width, and alinement; means indicating that the dollar-spaces are for figures indicating the number of dollars payable; means indicating that the cent-spaces are for figures to indicate the number of cents payable; a series of spaces outside of the main body of the instrument, arranged in rows, one for thousands of dollars, one for hundreds, one for tens, and one for units; means in the first left-hand space of each row, indicating none; printing within each of the other spaces in each row indicating one or more units, tens, hundreds, or thousands, as the case may be, the smallest number being printed in the next to the extreme left-hand space, and the amounts increasing arithmetically, from left to right; and means in the body of the instrument indicating that the amount appearing in the dollar and cent spaces therein should correspond with the amount punched or marked out in said spaces outside of the body of the instrument, substantially as described.

4. As a new article of manufacture, a blank negotiable instrument containing in the body thereof a series of dollar-spaces arranged in a row, and each of a size suitable for a single written figure above said row of dollar-spaces; a row of cent-spaces of the same number, width, and alinement, each adapted to receive a single written figure; printing in said dollar-spaces in lighter signs on a ground shaded with lines indicating the number of the figure counting from the left which should be inserted in each dollar-space: means indicating which row of spaces are for figures indicating dollars; and means indicating which row are for figures indicating cents; without the main body of the instrument a series of spaces arranged in rows one for thousands of dollars, one for hundreds; one for tens, and one for units; means indicating what a punch or mark in each space will signify and means in the instrument indicating that the amount indicated by the punching or marking of said spaces must correspond with the amount indicated by figures placed in said dollar-spaces and cent-spaces in the body of the instrument.

JOSEPH J. KULAGE.

Witnesses:
BENJ. F. REX,
S. SIDEBOTHAM.